J. HEALY.
Construction and Hanging of Gates.
No. 46,667.  Patented March 7, 1865.
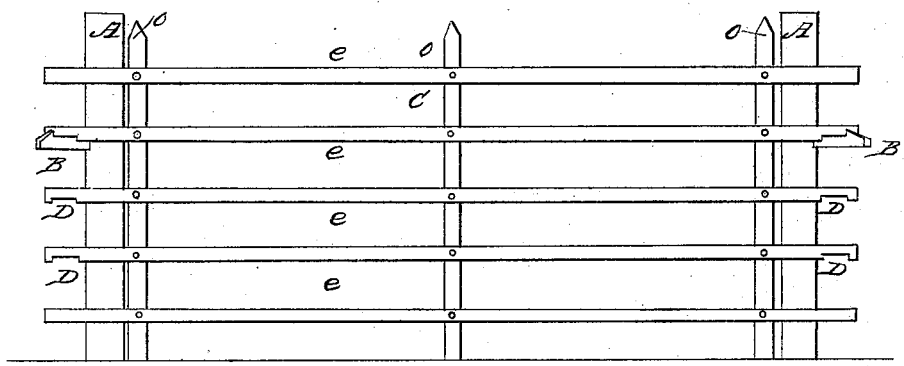
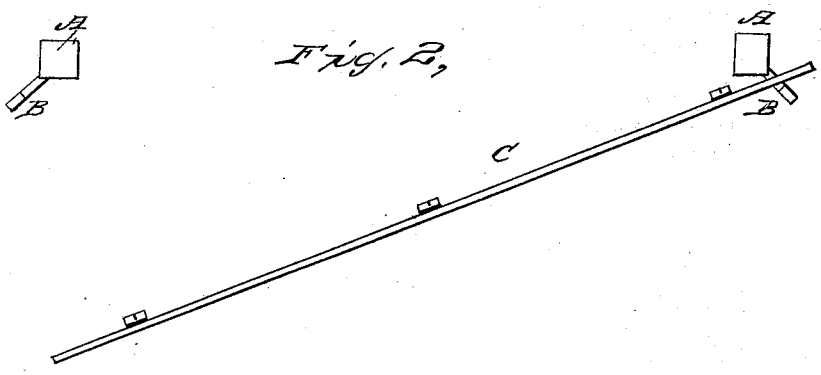

UNITED STATES PATENT OFFICE.

J. HEALY, OF SOUTH DANSVILLE, NEW YORK.

IMPROVEMENT IN THE CONSTRUCTION AND HANGING OF GATES.

Specification forming part of Letters Patent No. 4C,367, dated March 7, 1865.

*To all whom it may concern:*

Be it known that I, J. HEALY, of South Dansville, in the county of Steuben and State of New York, have invented a new and useful Improvement in Gates; and I do hereby declare that the following is a full, clear, and exact description thereof, which will enable others skilled in the art to make and use the same, reference being had to the accompanying drawings, forming part of this specification, in which—

Figure 1 is an elevation of a farm-gate constructed and applied according to my invention. Fig. 2 shows the gate open, the view being taken from above.

Similar letters of reference indicate like parts.

This invention has for its object to produce a gate which may be opened from the right or left hand sides, and suspended at different heights above the ground to allow small animals to pass beneath, and which may be lifted off its points of suspension without making any changes in the gate or its posts.

C represents the gate, and A A its posts, the latter being set firmly in the ground.

B B are keepers or hooks driven in or fixed upon the posts, so as to extend therefrom away from the gate at an angle of forty five degrees with the plane of its face when it is in place, as shown in the drawings.

The gate itself is made by securing rails $e$ to three or more uprights, O, the outermost uprights being at a less distance apart than the distance apart of the posts A, so that they fall between them when the gate is closed. The rails $e$ extend beyond the outermost uprights past the posts, so as to be able to engage with the hooks of the keepers B. The keepers extend from the posts to such a distance as to permit the gate while still suspended upon them at one end to be turned around a quarter of a circle, when the gate will stand at right angles to its position when closed.

Recesses or hooks D are formed on the under side of some of the rails $e$ at their ends, to enable them to lock upon the keepers B and keep the gate safe from displacement by any violent shock against it in a lateral direction.

The keepers B serve the double purpose of hinge and hook at either end, the rails of the gate being extended with that end in view.

Among the advantages of my gate are its simplicity of const uction and its economy of material. Only o e post is needed at each side of the gateway. If snow obstructs and fills up the gateway, the gate may be raised and suspended upon the keepers B by one of the lower rails, and if it is desired to prevent the passage through it of cattle and horses and at the same time permit the passage of sheep and other animals of low stature, the gate can be raised to the r quired distance by the same means. It is evident that the same principle can be applied to a continuous fence, the keeper being, when set, at right angles to the line of the fence, and of a sufficient length to admit the thickness of two panels within its hook.

I claim as new and desire to secure by Letters Patent—

The gate above described, constructed and applied substantially as above set forth.

J. HEALY.

Witnesses:
O. TOUSEY,
ABRM. LOZIER.